United States Patent [19]

Yoshida et al.

[11] 3,742,149

[45] June 26, 1973

[54] FREQUENCY DIVISION MULTIPLEX MICROWAVE COMMUNICATION SYSTEM USING POLARIZATION DIVISION MULTIPLEX TECHNIQUE

[75] Inventors: Hiroshi Yoshida; Kimio Narahara, both of Tokyo, Japan

[73] Assignee: Nippon Electric Company, Limited, Tokyo, Japan

[22] Filed: Apr. 30, 1971

[21] Appl. No.: 139,164

[30] Foreign Application Priority Data

May 6, 1970 Japan ............................... 45/38821

[52] U.S. Cl. ................. 179/15 FS, 325/50, 325/65, 343/100 PE, 343/200

[51] Int. Cl. ............................................. H04j 1/08

[58] Field of Search ................. 325/50, 56, 65, 137, 325/9, 11; 179/15 FS, 15 FD; 343/100 PE, 200

[56] References Cited

UNITED STATES PATENTS

| | | | |
|---|---|---|---|
| 3,092,828 | 6/1963 | Allen | 325/56 |
| 3,294,913 | 12/1966 | Saraga | 325/50 |
| 2,992,427 | 7/1961 | Franco | 325/56 |
| 2,756,418 | 7/1956 | Duane, Jr. | 343/100 |
| 3,093,284 | 6/1963 | Ammerman | 343/100 |
| 2,848,714 | 8/1958 | Ring | 343/100 |

*Primary Examiner*—Robert L. Griffin
*Assistant Examiner*—Marc E. Bookbinder
*Attorney*—Sughrue, Rothwell, Mion, Zinn & Macpeak

[57] ABSTRACT

A signal transmission and reception system which includes means for transmitting a plurality of information signals each of which occupies a different frequency band. The information signals, which may correspond to television signals, amplitude-modulate a carrier wave to produce single side band components of the modulated carrier wave, each single side band component corresponding to a different information signal. The components are combined into two groups of side band components each group being comprised of side band components corresponding to alternate, adjacent information signal frequency bands. The two composite signals are transmitted by transmitter means which uniquely polarize each composite signal with respect to the other. Receiving means, responsive to each of the polarized signals, detect the composite signals and apply each to a different demodulator. The demodulated signals are combined to reconstruct the information contained in the plurality of transmitted information signals.

4 Claims, 2 Drawing Figures

INVENTORS
HIROSHI YOSHIDA
KIMIO NARAHARA

BY Sughrue, Rothwell, Mion, Zinn & Macpeak

ATTORNEYS

FREQUENCY DIVISION MULTIPLEX MICROWAVE COMMUNICATION SYSTEM USING POLARIZATION DIVISION MULTIPLEX TECHNIQUE

This invention relates to a multiplexed microwave communication system and, more particularly to a frequency-division-multiplexed and polarization-division-multiplexed microwave communication system.

In a conventional multiplexed microwave transmission system, multichannel VHF (Very High Frequency) or UHF (Ultra High Frequency) television signals, which are adjacent to one another in the frequency domain, are caused to respectively modulate carrier waves in the single sideband (SSB) fashion to achieve the frequency-division-multiplexing. In the conventional system, however, the cross modulation is unavoidable between the carrier waves for video and audio signals and the color subcarrier. The cross modulation, caused by the non-linear distortion at the amplitude modulation and the power amplifier in the transmitter and at the amplitude demodulator in the receiver, causes disturbances and noises to other transmission channels. Therefore, high level cross modulation components must be attenuated.

The fourth or higher harmonic components attributed to the cross modulation have practically negligible levels, and so may be put out of consideration. Since the second harmonic component due to the cross modulation is apart from its own channel in frequency, it is the practice to assign the frequency bands to each of the channels so that second harmonic component may not appear within the assigned frequency range. However, the third harmonic component due to the cross modulation appears in the region adjacent to the assigned channel and causes disturbances. To give sufficient attenuation to the third harmonic component at the transmitter, care must be taken not to adversely affect its amplitude-phase characteristic within the assigned channel. Therefore, a very-high-Q notch cavity is usually needed. As a result, the conventional transmitter tends to be not only bulkly but expensive, despite its unsatisfactory attenuation effect on the cross modulation components.

It is, therefore, an object of the invention to provide a multiplexed microwave transmission system particularly for TV video and other signals, in which the cross modulation components are satisfactorily suppressed.

According to this invention, there is provided a microwave relay system for TV video and other signals, those signals are multiplexed in the SSB frequency division fashion and transmitted in the polarization division fashion.

Figure 1:
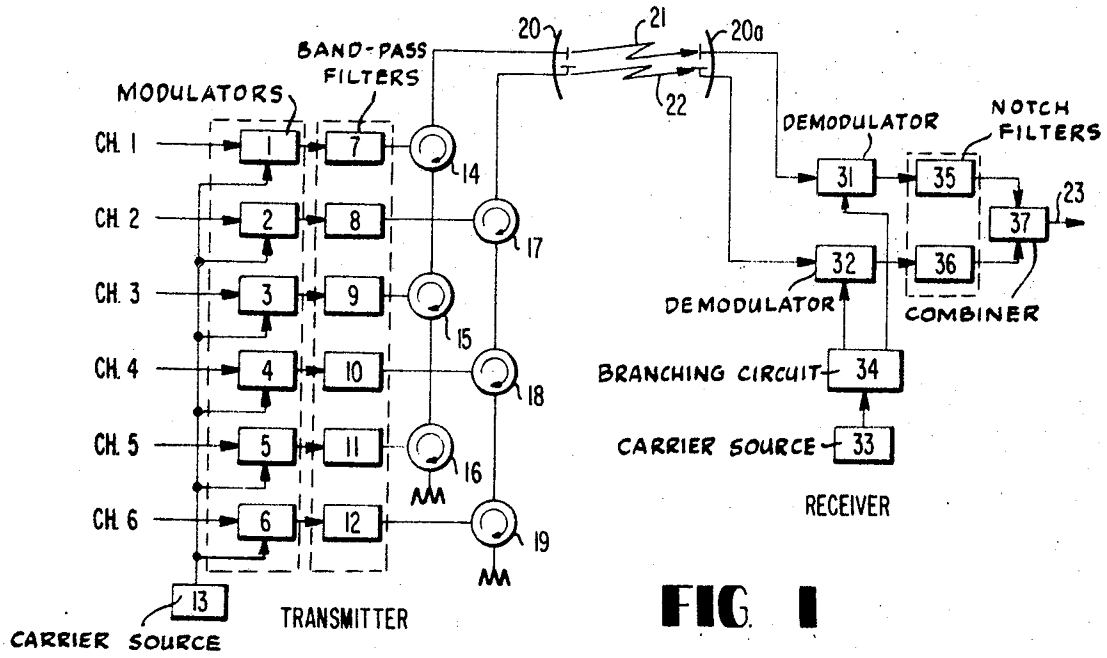

Now the features and advantages of this invention will be clearly understood from the following detailed description of a preferred embodiment of this invention taken in connection with the accompanying drawings, wherein:

FIG. 1 is a block diagram of the embodiment of this invention; and

FIG. 2(a)–(c) shows frequency spectrum of the multiplexed and transmitted signals.

Figure 2:
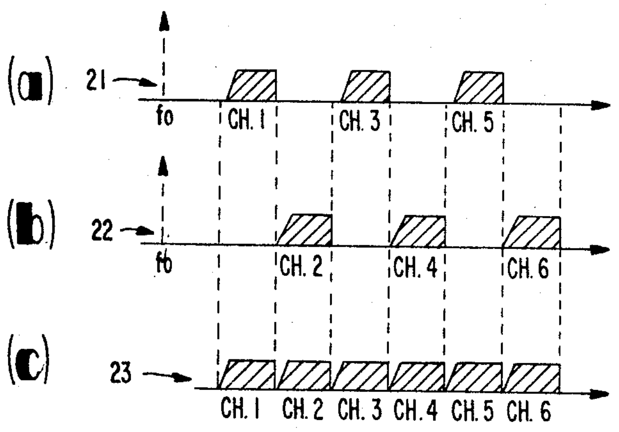

Referring to FIGS. 1 and 2, at SSB modulators 1, 2, . . . and 6, six television signals are caused to modulate a microwave carrier wave supplied from a microwave source 13. The SSB modulated carrier waves from the modulators 1, 3 and 5 are caused to pass through band-pass filters 7, 9 and 11, respectively, and then combined by circulators 14, 15 and 16. The combined carrier wave 21 has a frequency spectrum shown in FIG. 2 (a) and has a vertical plane of polarization, while being transmitted from a transmitting antenna 20. On the other hand, the SSB modulated carrier waves from the modulators 2, 4 and 6 are caused to pass through band-pass filters 8, 10 and 12, respectively, and then combined by circulators 17, 18 and 19. Thus, a combined carrier wave 22 having a frequency spectrum as shown in FIG. 2 (b) is obtained. The combined signal is given a horizontal plane of polarization for transmission from the transmitting antenna 20.

The transmitted carrier waves 21 and 22 differentiated by the polarization direction are received by a receiving antenna 20*a*. The received carrier waves are separately applied to demodulators 31 and 32, which are respectively supplied with demodulation carrier waves from a carrier wave source 33 via a branching circuit 34, and are demodulated to the television signals. The demodulated television signals from demodulators 31 and 32 are applied to notch filters 35 and 36, respectively. At the notch filters 35 and 36, the third harmonic cross modulation components are suppressed.

The television signals from the notch filters 35 and 36 are then applied to an combiner 37 and combined with each other to form the frequency division multiplexed SSB carrier wave 23 having a frequency spectrum as shown in FIG. 2 (c).

Since the degree of the frequency division multiplexing, when viewed as to each of the polarization-divided carrier waves is just one half of that of the conventional system of the kind, the system of this invention makes it possible to apply sufficient attenuation to the third harmonic cross modulation components, without affecting the contents of the respective television signals. This permits the improvement in the quality of the multiplexed microwave SSB transmission system. Furthermore, since the attenuation is applied to the third harmonic cross modulation components at the VHF (or UHF) band, the Q required for the notch filters need not be so high as it the case of the conventional system. This miniturizes the receiver as a whole.

In the foregoing embodiment, the description has been made of the multiplexed transmission of six television signals. It will be clear however that the number of channels may be greater and that the signals to be transmitted are not limited to the television signals. Furthermore, one or more of those television signals may be replaces by other forms of signals multiplexed by the frequency division multiplexing technique.

What is claimed is:

1. A frequency division multiplex signal transmission system for transmitting a plurality of information signals each occupying a distinct, non-overlapping frequency band and each occupying substantially the same frequency band width, comprising:

a plurality of modulator means for amplitude-modulating a carrier wave by each of said information signals to produce a plurality of single side band components of the modulated carrier wave, said single side band components being separated from each other in frequency domain;

first and second combiner means for combining every other ones of said single side band components to produce first and second single side band component groups, respectively, each group being comprised of side band components corresponding to alternate, adjacent frequency bands;

means for transmitting said two sideband component groups as a horizontally polarized carrier wave and a vertically polarized carrier wave, respectively; and means at the receiving site responsive to each of the polarized carrier waves for demodulating said side band components respectively.

2. A signal transmission system of claim 1 wherein said means at the receiving site comprises: first receiver means sensitive to the polarization of one of said two side band component groups, second receiver means sensitive to the polarization of the other of said two side band component groups, first and second demodulator means coupled respectively to said first and second receiver means for demodulating respectively said one and other of the two side band component groups and combiner means coupled to said first and second demodulator means for combining the demodulated signals.

3. The signal transmission system of claim 1 wherein said plurality of amplitude-modulating means comprises a plurality of single side band modulators each receiving a different one of said information signals and said carrier wave, said first combiner means comprising first circulator means coupled to a group of said plurality of modulators receiving single side band components occupying alternate, adjacent frequency bands said second combiner means comprising a second circulator means coupled to the remaining modulators.

4. The signal transmission system of claim 2 wherein said means at the receiver site further includes filter means coupled to the output of each of said demodulation means for suppressing the third harmonic cross modulation components appearing in the regions adjacent to the frequency bands occupied by said side band components.

* * * * *